US012517451B2

(12) United States Patent
Kondo et al.

(10) Patent No.: US 12,517,451 B2
(45) Date of Patent: Jan. 6, 2026

(54) IMAGE FORMING APPARATUS THAT LIMITS MAXIMUM POWER SUPPLIED TO HEATING MEMBER FOR PREDETERMINED SPECIFIC PERIOD OF TIME WHEN POWER SUPPLY TO HEATING MEMBER IS RESUMED

(71) Applicant: KYOCERA Document Solutions Inc., Osaka (JP)

(72) Inventors: Akihiro Kondo, Osaka (JP); Ryohei Tokunaga, Osaka (JP); Yuta Kitabayashi, Osaka (JP); Rina Kikugawa, Osaka (JP); Hiroki Kawasaki, Osaka (JP); Shunsaku Fujii, Osaka (JP); Yuto Masaoka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 159 days.

(21) Appl. No.: 18/640,337

(22) Filed: Apr. 19, 2024

(65) Prior Publication Data

US 2024/0361714 A1 Oct. 31, 2024

(30) Foreign Application Priority Data

Apr. 26, 2023 (JP) ................................ 2023-072739

(51) Int. Cl.
*G03G 15/20* (2006.01)
*G03G 15/00* (2006.01)

(52) U.S. Cl.
CPC ....... *G03G 15/205* (2013.01); *G03G 15/2064* (2013.01); *G03G 15/5004* (2013.01); *G03G 2215/00772* (2013.01)

(58) Field of Classification Search
None
See application file for complete search history.

(56) References Cited

U.S. PATENT DOCUMENTS 11,415,916 B1 * 8/2022 Ishii .................... G03G 15/205
2005/0201768 A1 * 9/2005 Tatematsu ............ G03G 15/205 399/69

(Continued)

FOREIGN PATENT DOCUMENTS

JP 2019133018 A 8/2019

*Primary Examiner* — Sevan A Aydin
(74) *Attorney, Agent, or Firm* — IP Business Solutions, LLC.

(57) ABSTRACT

An image forming apparatus according to an aspect of the present disclosure includes a fixing device and a controller. The fixing device includes a fixing member, a pressure member, a heating member, and a temperature sensor. The controller cuts off power supply to the heating member when the temperature detected by the temperature sensor has risen to a cutoff temperature higher than the target temperature and thereafter resumes power supply to the heating member when the detected temperature has fallen below the cutoff temperature, and performs the PID control while limiting a maximum power supplied to the heating member to an upper limit power, which is a power supplied to the heating member at the time when the detected temperature has risen to the cutoff temperature, during a period from when power supply is resumed until a predetermined specific period of time elapses.

4 Claims, 7 Drawing Sheets

(56) References Cited

U.S. PATENT DOCUMENTS

| | | | | |
|---|---|---|---|---|
| 2007/0036570 | A1* | 2/2007 | Tatematsu | G03G 15/205 399/69 |
| 2011/0293309 | A1* | 12/2011 | Hase | G03G 15/2039 399/69 |
| 2015/0237916 | A1* | 8/2015 | Farine | A24F 40/53 219/492 |
| 2018/0010805 | A1* | 1/2018 | Bach | F24C 7/087 |
| 2024/0369259 | A1* | 11/2024 | Rovinskyi | F24H 1/122 |

* cited by examiner

IMAGE FORMING APPARATUS THAT LIMITS MAXIMUM POWER SUPPLIED TO HEATING MEMBER FOR PREDETERMINED SPECIFIC PERIOD OF TIME WHEN POWER SUPPLY TO HEATING MEMBER IS RESUMED

INCORPORATION BY REFERENCE

This application claims priority to Japanese Patent Application No. 2023-072739 filed on 26 Apr. 2023, the entire contents of which are incorporated by reference herein.

BACKGROUND

The present disclosure relates to an image forming apparatus including a fixing device that fixes an image formed on a recording medium by thermocompression bonding.

An electrophotographic image forming apparatus includes a fixing device that fixes an image formed on a recording medium. The fixing device includes a fixing member, a pressure member that is disposed to face the fixing member and forms a nip portion between itself and the fixing member into which a recording medium to be fixed is inserted, and a heating member that heats the fixing member. The fixing device fixes the image formed on the recording medium onto the recording medium in the nip portion by heat and pressure (thermocompression bonding).

The fixing device generally includes a temperature sensor that detects the temperature of the heating member and drives the heating member using PID control, which is a type of feedback control, to bring the temperature detected by the temperature sensor to a predetermined target temperature.

Incidentally, raising the temperature of the heating member in the image forming apparatus may cause an overshoot (an excessive temperature rise) in which the temperature of the heating member significantly exceeds the target temperature, damaging parts of the fixing device. A technique that cuts off (or reduces) power supplied to the heating member when the temperature detected by the temperature sensor has risen to a predetermined cutoff temperature (an abnormal temperature higher than the target temperature) is generally used to prevent damage to parts due to an overshoot.

A technology in which a lower limit lighting rate of the heating member is set in order to prevent the occurrence of an undershoot due to an overshoot of the temperature of the fixing member is also generally known.

SUMMARY

An aspect of the present disclosure proposes a technology that is a further improvement of the above technology.

An image forming apparatus according to an aspect of the present disclosure includes a fixing device and a controller. The fixing device includes a fixing member, a pressure member, a heating member, and a temperature sensor. The pressure member is disposed to face the fixing member and forms a nip portion between the pressure member and the fixing member into which a recording medium to be fixed is inserted. The heating member heats the fixing member. The temperature sensor detects a temperature of the heating member or the fixing member. The controller includes a processor and drives, by the processor executing a control program, the heating member using proportional-integral-differential (PID) control to bring the temperature detected by the temperature sensor to a predetermined target temperature. The controller cuts off power supply to the heating member when the detected temperature has risen to a predetermined cutoff temperature higher than the target temperature and thereafter resumes power supply to the heating member when the detected temperature has fallen below the cutoff temperature, and performs the PID control while limiting a maximum power supplied to the heating member to an upper limit power, which is a power supplied to the heating member at a time when the detected temperature has risen to the cutoff temperature, during a period from when power supply is resumed until a predetermined specific period of time elapses.

DETAILED DESCRIPTION

Figure 1:
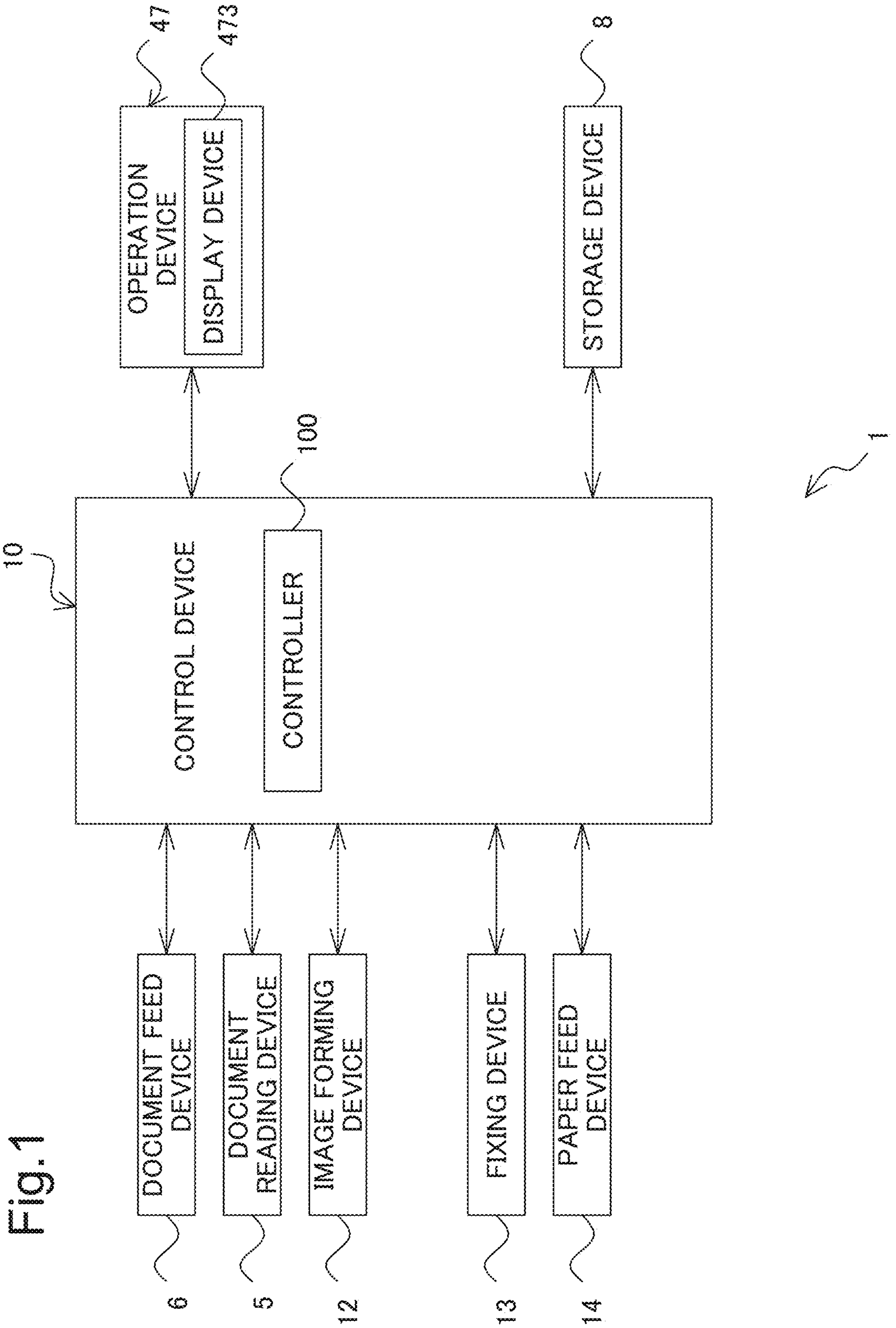
FIG. 1 is a functional block diagram schematically showing a main internal configuration of an image forming apparatus according to an embodiment of the present disclosure.

An image forming apparatus according to an embodiment of the present disclosure will be described below with reference to the drawings. FIG. 1 is a functional block diagram schematically showing a main internal configuration of an image forming apparatus 1 according to an embodiment of the present disclosure. The image forming apparatus 1 is a multifunction device having multiple functions such as a copy function, a printer function, a scanner function, and a facsimile function.

The image forming apparatus 1 includes a control device 10, a document feed device 6, a document reading device 5, an image forming device 12, a fixing device 13, a paper feed device 14, an operation device 47, and a storage device 8.

The document feed device 6 is formed on an upper surface of the document reading device 5 such that the document feed device 6 is openable and closable via a hinge or the like. The document feed device 6 functions as a document holding cover when reading a document placed on platen glass. The document feed device 6 is an auto document feeder (ADF) which includes a document placement tray and supplies a document placed on the document placement tray to the document reading device 5.

A case where the image forming apparatus 1 performs a document reading operation will be described. The document reading device 5 optically reads an image of a document, which has been supplied to the document reading device 5 by the document feed device 6, or a document placed on the platen glass and generates image data. The image data generated by the document reading device 5 is stored in an image memory or the like.

A case where the image forming apparatus 1 performs an image forming operation will be described. The image forming device 12 forms a toner image on recording paper, which is a recording medium fed from the paper feed device 14, based on image data generated by the document reading operation, image data stored in the image memory, image data received from a computer connected to a network, or the like.

The fixing device 13 heats and presses the recording paper on which the toner image has been formed by the image forming device 12 to fix the toner image on the recording paper. The recording paper that has been subjected to the fixing process is discharged to a discharge tray. The paper feed device 14 includes a paper feed cassette.

The operation device 47 receives, from a user, instructions regarding various operations and processing that can be performed by the image forming apparatus 1 such as an instruction to perform an image forming operation. The operation device 47 includes a display device 473 that displays operation guidance and the like to the user. The operation device 47 receives an input of an instruction from the user via a touch panel included in the display device 473 based on the user's operation (touch operation) performed on an operation screen displayed on the display device 473.

The display device 473 includes a liquid crystal display (LCD) or the like. The display device 473 includes the touch panel. When the user has performed an operation of touching a button or key displayed on the screen, the touch panel receives an instruction associated with the position where the touch operation has been performed.

The storage device 8 is a large capacity storage device such as a hard disk drive (HDD) or a solid state drive (SSD) and stores various control programs and the like.

The control device 10 includes a processor, a random access memory (RAM), a read only memory (ROM), and a dedicated hardware circuit. The processor is, for example, a central processing unit (CPU), an application specific integrated circuit (ASIC), or a micro processing unit (MPU).

The control device 10 functions as a controller 100 by the processor performing an operation according to a control program stored in the storage device 8. Here, the controller 100 may be formed of a hardware circuit rather than being implemented by the control device 10 performing an operation according to the control program. Hereinafter, the same applies to each embodiment unless otherwise specified.

The controller 100 controls overall operations of the image forming apparatus 1. The controller 100 is connected to the document feed device 6, the document reading device 5, the image forming device 12, the fixing device 13, the paper feed device 14, the operation device 47, and the storage device 8 and controls driving or the like of each of these devices. For example, the controller 100 performs various processing or the like necessary for the image forming apparatus 1 to perform image forming.

Figure 2:
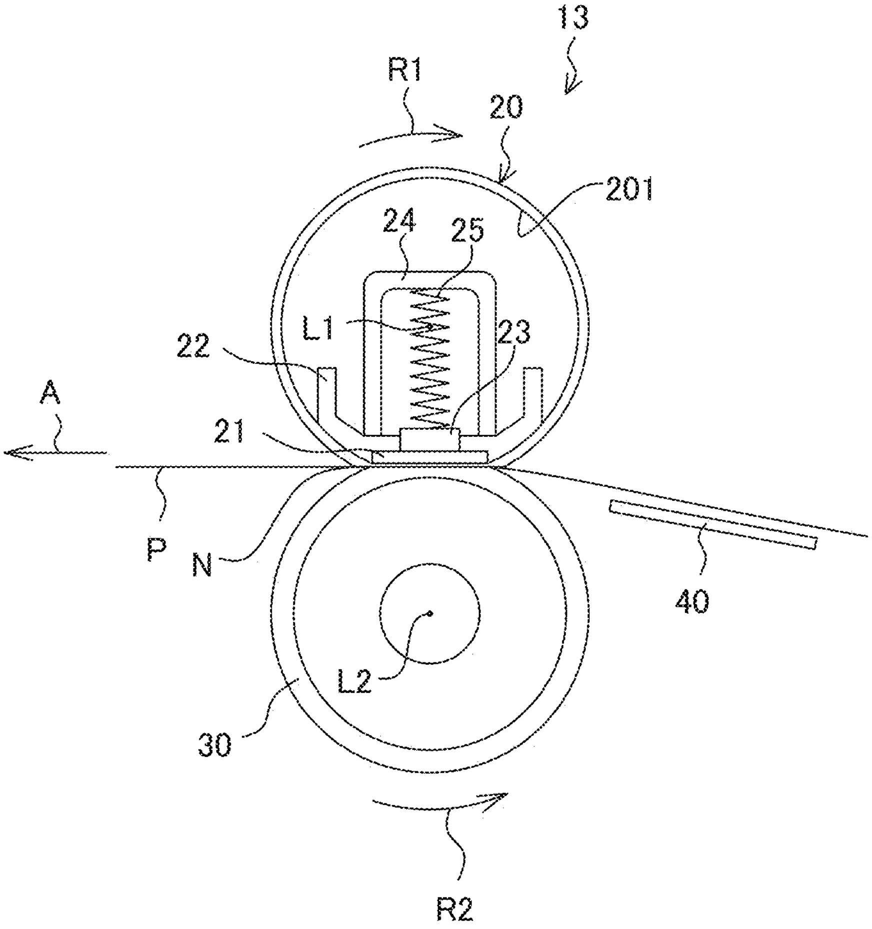
FIG. 2 is a cross-sectional view schematically showing an example of a fixing device included in the image forming apparatus.

FIG. 2 is a cross-sectional view schematically showing an example of the fixing device 13 included in the image forming apparatus 1. The fixing device 13 includes a fixing member 20, a pressure member 30, a heating member 21, a holding member 22, a temperature sensor 23, a reinforcing member 24, a biasing member 25, and a conveyance guide 40.

The fixing member 20 is an endless belt that heats a recording medium (recording paper P) on which a toner image has been formed. The fixing member 20 is rotatable about a first rotation axis L1 and extends in the direction of the first rotation axis L1.

In FIG. 2, the pressure member 30 is a roller that is rotatable about a second rotation axis L2 that is parallel to the first rotation axis L1 extending in a direction perpendicular to the page and extends in the direction of the second rotation axis L2. The pressure member 30 forms a nip portion N between itself and the fixing member 20 in which the recording paper P which is a recording medium is nipped and conveyed, thus causing the fixing member 20 to rotate following the rotation of the pressure member 30. The recording paper P on which a toner image has been formed is guided by the conveyance guide 40 and conveyed and nipped in the nip portion N. An arrow A indicates the conveyance direction of the recording paper P.

The fixing member 20 follows the rotation of the pressure member 30 in a second rotation direction R2 (in a counterclockwise direction in FIG. 2) about the second rotation axis L2 and thus rotates in a first rotation direction R1 (in a clockwise direction in FIG. 2) about the first rotation axis L1.

The heating member 21 heats the fixing member 20. The heating member 21 is a planar heater that extends in the direction of the first rotation axis L1 and is disposed inside the fixing member 20 and faces an inner circumferential surface 201 of the fixing member 20. The heating member 21 is, for example, a ceramic heater with a relatively low heat capacity and includes a ceramic substrate and a resistance heating element.

The holding member 22 holds the heating member 21. The holding member 22 is a heat-resistant resin member having a U-shaped cross section and extending in the direction of the first rotation axis L1.

The temperature sensor 23 faces the heating member 21 and detects the temperature of the heating member 21. The temperature sensor 23 is inserted into a through hole formed in the holding member 22 and comes into contact with the heating member 21. The temperature sensor 23 is, for example, a thermistor.

The reinforcing member 24 is a metal stay having an inverted U-shaped cross section and extending in the direction of the first rotation axis L1. The reinforcing member 24 is fixed to the holding member 22 to reinforce the holding member 22.

The biasing member 25 is disposed between the temperature sensor 23 and the reinforcing member 24 and biases the temperature sensor 23 in a direction from the temperature sensor 23 to the heating member 21. The biasing member 25 is, for example, a coil spring.

The controller 100 controls the heating member 21 using proportional-integral-differential (PID) control to bring a temperature D detected by the temperature sensor 23 to a predetermined target temperature T.

The controller 100 cuts off power supply to the heating member 21 when the temperature D detected by the temperature sensor 23 has risen to a predetermined cutoff temperature C that is higher than the target temperature T and thereafter resumes power supply to the heating member 21 when the detected temperature D has fallen below the cutoff temperature C. Here, the controller 100 continues to perform PID control calculation while the power supply to the heating member 21 is cut off. That is, while the power supply to the heating member 21 is cut off, the controller 100 continues to perform PID control calculation in parallel in the background. The cutoff temperature C is an upper limit temperature of the heating member 21 and is preset and stored in a nonvolatile memory built into the control device 10 or in the control program. The cutoff temperature C is, for example, 20% higher than the target temperature T.

The controller 100 performs PID control while limiting the maximum power supplied to the heating member 21 to an upper limit power UL, which is a power supplied to the heating member 21 (an instructed supply power) at the time when the detected temperature D has risen to the cutoff temperature C, during a period from when the detected temperature D becomes less than the cutoff temperature C and the power supply to the heating member 21 is resumed until a predetermined specific period of time TM elapses.

For example, if the difference between a target temperature T and a predetermined cutoff temperature C that is higher than the target temperature T is small in the case of performing control to cut off power supply to the heating member 21 when the temperature D detected by the temperature sensor 23 has risen to the predetermined cutoff temperature C and thereafter resume the power supply to the heating member 21 when the detected temperature D has fallen below the cutoff temperature C (without performing control that limits the maximum power supplied to the heating member 21 to the upper limit power UL), excessive power is applied to the heating member 21, resulting in an environment where an overshoot occurs when power supply to the heating member is resumed, and thus temperature ripples are large, temperature control is unstable, and it takes time for the heating member 21 to stabilize at the target temperature. In the present embodiment, a period from when power supply to the heating member 21 is resumed upon the detected temperature D falling below the cutoff temperature C until there is no longer a risk that such an overshoot will occur is detected and specified in advance through experiments or the like and is set as the specific period of time TM described above.

Figure 3:
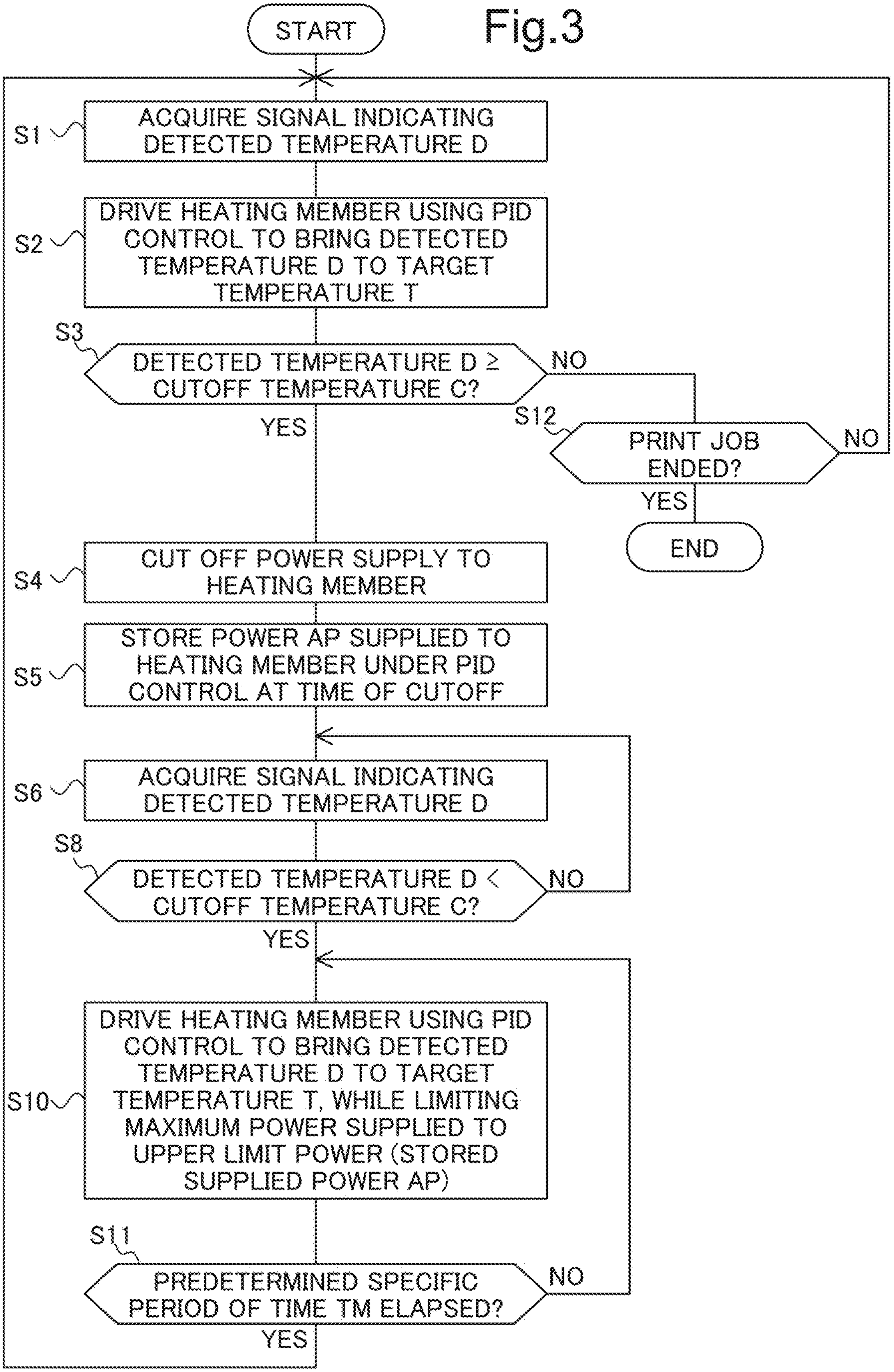
FIG. 3 is a flowchart showing a flow of a process performed when controlling driving of a heating member provided in the fixing device.

Next, an example of a process performed when controlling driving of the heating member 21 provided in the fixing device 13 will be described with reference to a flowchart shown in FIG. 3. This process is performed, for example, when the operation device 47 has received an instruction to perform a print job from the user.

When the operation device 47 has received an instruction to perform a print job, the controller 100 acquires a signal indicating a temperature D detected by the temperature sensor 23 from the temperature sensor 23 (step S1) and supplies power to and drives the heating member 21 using PID control to bring the temperature D detected by the temperature sensor 23 to the target temperature T (step S2).

The controller 100 determines whether the detected temperature D has risen to the cutoff temperature C (step S3). Upon determining that the detected temperature D has risen to the cutoff temperature C (YES in step S3), the controller 100 cuts off power supply to the heating member 21 (step S4) and stores a power AP supplied to the heating member 21 under the PID control at the time of cutoff (step S5). Here, means for cutting off power supply to the heating member 21 is a soft cutoff and a hard cutoff.

Subsequently, the controller 100 acquires a signal indicating the temperature D detected by the temperature sensor 23 when necessary (step S6). The controller 100 continues to calculate a power instructed by the PID control for bringing the heating member 21 to the target temperature T based on the temperature D detected by the temperature sensor 23. The controller 100 determines whether the detected temperature D has fallen below the cutoff temperature C (step S8), and upon determining that the detected temperature D has fallen below the cutoff temperature C (YES in step S8), again supplies power to and drives the heating member 21 using PID control to bring the temperature D detected by the temperature sensor 23 to the target temperature T (step S10). Namely, the controller 100 resumes power supply to the heating member 21.

In step S10, the controller 100 performs PID control while limiting the maximum power supplied to the heating member 21 to the upper limit power UL. Here, the controller 100 sets the upper limit power UL to the supplied power AP stored in step S5. On the other hand, when the controller 100 has determined that the detected temperature D has not fallen below the cutoff temperature C (NO in step S8), the process returns to step S6.

Subsequently, the controller 100 determines whether a predetermined specific period of time TM has elapsed from when it determined that the detected temperature D has fallen below the cutoff temperature C (step S11). When the controller 100 has determined that the predetermined specific period of time TM has elapsed (YES in step S11), the process returns to step S1. This releases the limitation on power supply to the heating member 21. On the other hand, when the controller 100 has determined that the predetermined specific period of time TM has not elapsed (NO in step S11), the processing of step S10 is repeated.

When the controller 100 has determined in step S3 that the detected temperature D has not risen to the cutoff temperature C (NO in step S3), the controller 100 determines whether the print job has ended (step S12), and when the controller 100 has determined that the print job has not ended (NO in step S12), the process returns to step S1 and the processing of steps S1 to S10 is continued until the print job ends. On the other hand, when the controller 100 has determined that the print job has ended (YES in step S12), this process ends.

Figure 4:
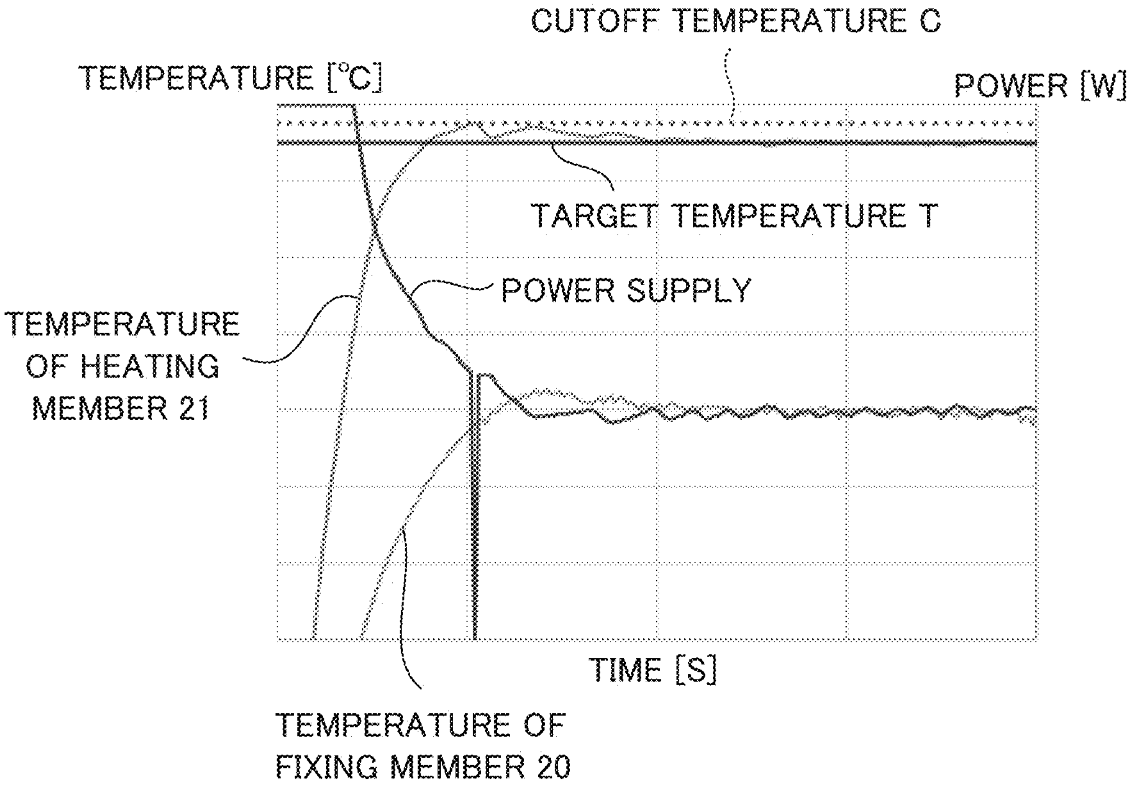
FIG. 4 is a graph showing temperature behaviors of the heating member and the fixing member and changes in power supplied to the heating member during PID control of the present disclosure.
Figure 5:
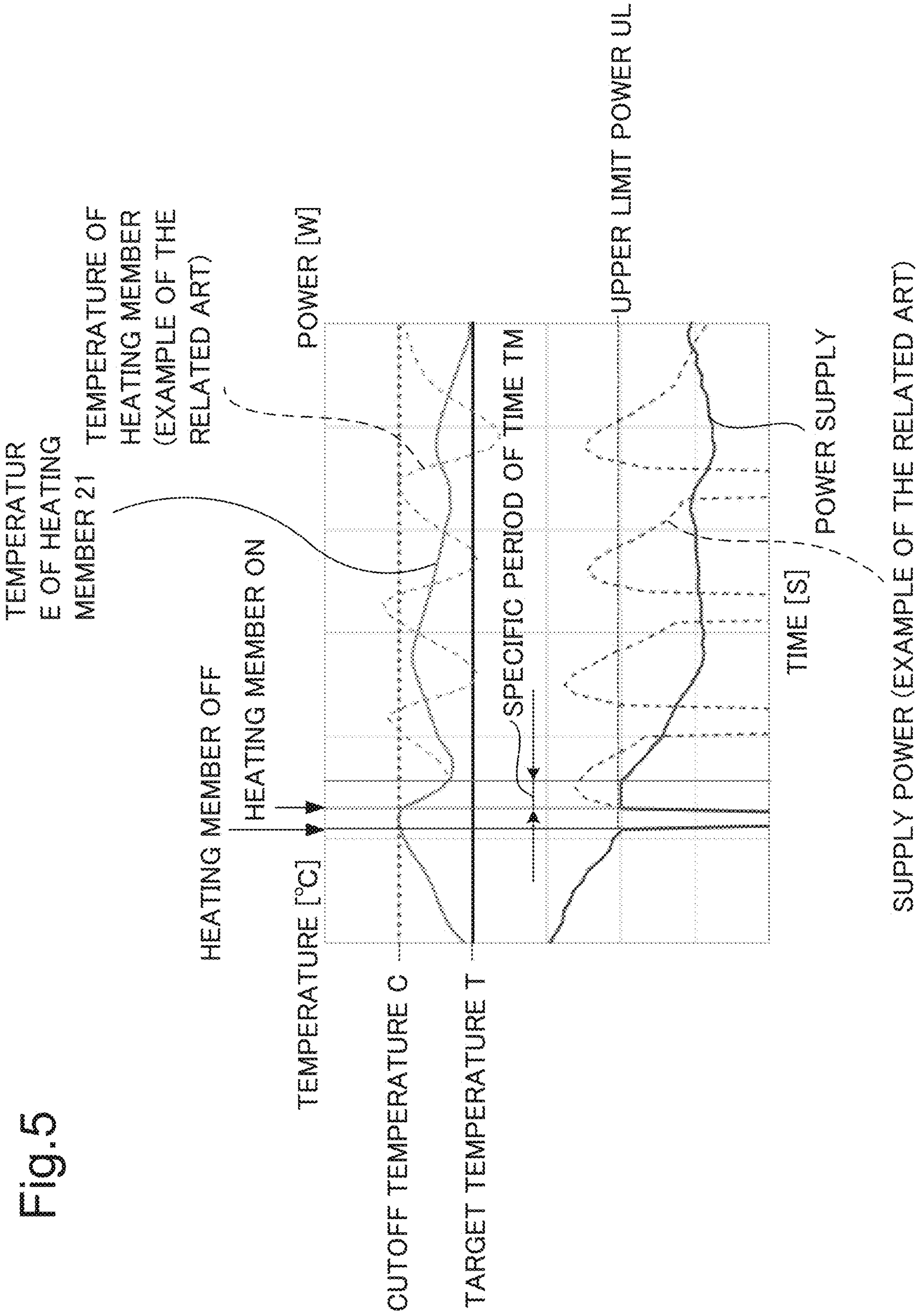
FIG. 5 is a partially enlarged graph of the graph shown in FIG. 4.

FIG. 4 is a graph showing temperature behaviors of the heating member 21 and the fixing member 20 and changes in power supplied to the heating member 21 during PID control of the present embodiment. FIG. 5 is a partially enlarged graph of the graph shown in FIG. 4.

Figure 6:
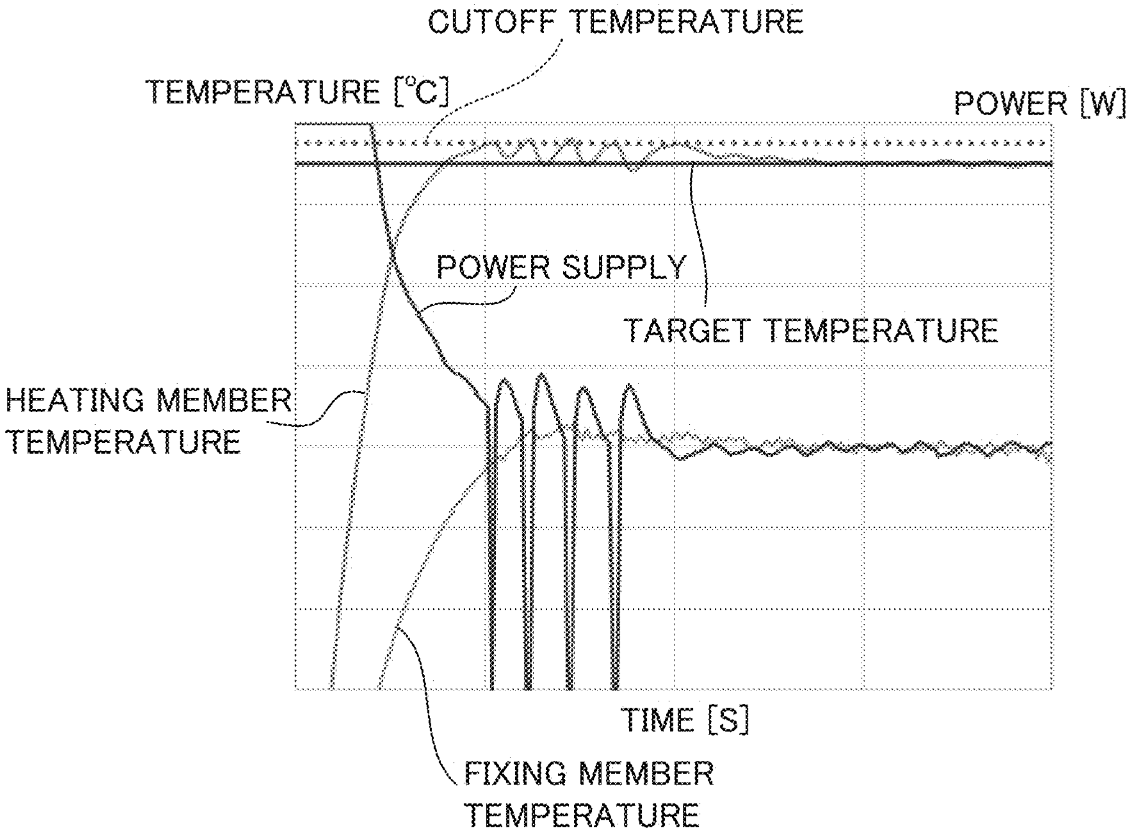
FIG. 6 is a graph showing temperature behaviors of a heating member and a fixing member and changes in power supplied to the heating member during PID control of the related art.
Figure 7:
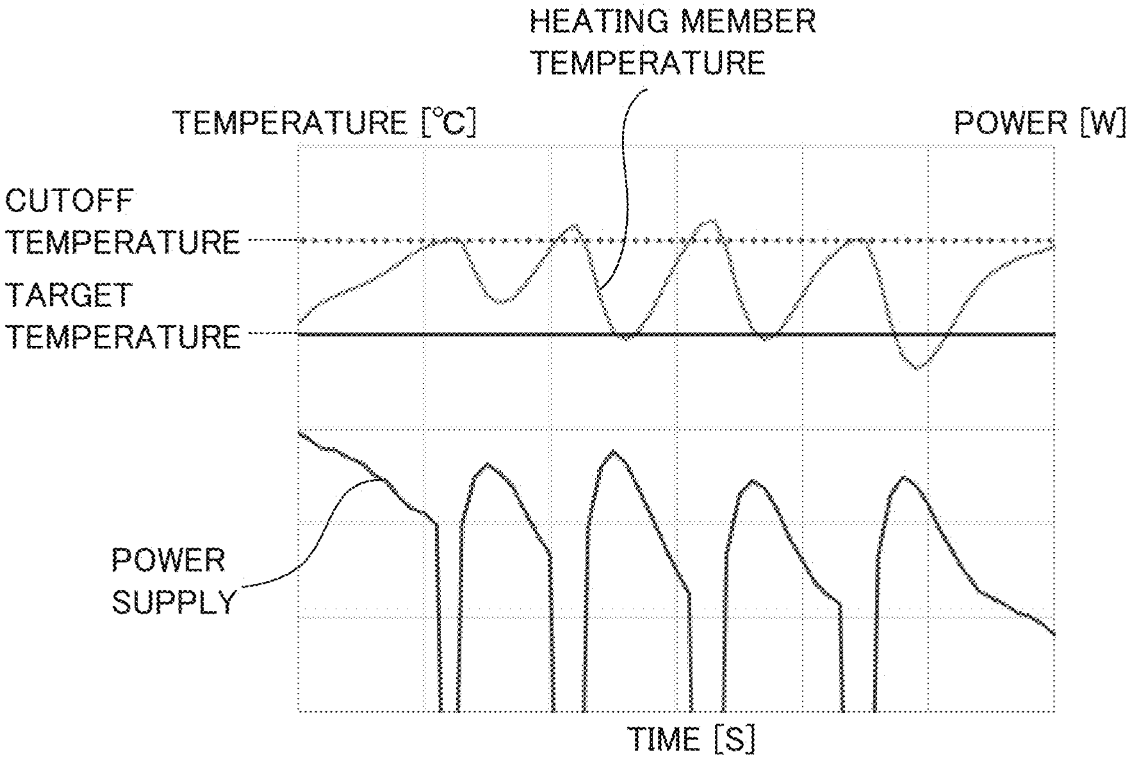
FIG. 7 is a partially enlarged graph of the graph shown in FIG. 6.

FIG. 6 is a graph showing temperature behaviors of a heating member and a fixing member and changes in power supplied to the heating member during PID control of the related art. FIG. 7 is a partially enlarged graph of the graph shown in FIG. 6.

In FIG. 5, the temperature behavior of the heating member of the related art shown in FIG. 7 and changes in the power supplied to the heating member are shown by broken lines. "HEATING MEMBER OFF" shown in FIG. 5 indicates the timing of cutting off power supply to the heating member 21 and "HEATING MEMBER ON" indicates the timing of resuming power supply to the heating member 21.

Here, as shown in FIGS. 6 and 7, if the temperature of the heating member rises to the cutoff temperature, the power supply to the heating member is cut off, such that the power supplied to the heating member decreases and the temperature of the heating member decreases. Thereafter, if the temperature of the heating member falls below the cutoff temperature, the power supply to the heating member is resumed, and after a while, the temperature of the heating member increases again.

However, in the related-art power control of the heating member, power supply is repeatedly cut off and resumed, resulting in large temperature ripples and unstable temperature control of the heating member as shown by example in FIGS. 6 and 7. When the temperature control is unstable, the temperature of the heating member may remain higher than the target temperature for a long time and image quality defects may occur due to hot offset. Also, if the temperature remains high for a long time, the life of parts will be shortened and safety will be reduced. In particular, if the difference between the target temperature and the cutoff temperature is small, there is a high possibility that an overshoot will occur when power supply to the heating member is resumed. In addition, when the temperature control is unstable, an undershoot is likely to occur and a fixing failure may occur.

In the general technology described above, a lower limit lighting rate of the heating member is set in order to prevent the occurrence of an undershoot due to an overshoot of the temperature of the fixing member. However, if the lower limit lighting rate of the heating member is set, the temperature may not be lowered sufficiently and the temperature of the heating member may not converge to the target temperature and become stable at a higher temperature than the target temperature.

On the other hand, according to the embodiment described above, an excessive temperature rise in the heating member 21 due to excessive power supply to the heating member 21 can be prevented because an upper limit is set for the power supplied to the heating member 21 during a period from when the detected temperature D becomes less than the cutoff temperature C (that is, from when power supply to the heating member 21 is resumed) until a specific period of time TM elapses. As a result, in the above embodiment, temperature ripples are small, temperature control is stable, overshoot is prevented, and the heating member 21 can rapidly converge to the target temperature T as shown in FIG. 5, unlike in the example of the related art (FIG. 7).

As described above, the upper limit power UL is set to the power AP supplied to the heating member 21 under PID control at the time when the detected temperature D has risen to the cutoff temperature C (that is, at the time when the power supply to the heating member 21 is cut off) and thus is a variable value.

This is because the temperature behavior of the heating member 21 is affected not only by the supplied power but also by the heating condition of the fixing device 13, the usage environment of the image forming apparatus 1, the type of the recording medium being conveyed, or the like and thus changes from time to time and is not constant.

If the upper limit power UL is set to a fixed value, it will not be possible to properly follow different temperature behaviors and there is a risk that the effect of preventing the temperature rise may be insufficient or the temperature of the heating member 21 may fall significantly below the target temperature T. On the other hand, if the upper limit power UL is set according to the situation at the time as in the above embodiment, it is possible to more properly deal with different temperature behaviors.

In the above embodiment, after power supply to the heating member 21 is cut off once the detected temperature D rises to the cutoff temperature C, the controller 100 may resume power supply to the heating member 21 as the detected temperature D becomes less than the cutoff temperature C and then the detected temperature D may rise again to the cutoff temperature C. In this case, the controller 100 continues the PID control using a power supplied to the heating member 21 at the time when the detected temperature D has risen again to the cutoff temperature C as an upper limit power UL. That is, the controller 100 newly sets the upper limit power UL. Because the controller 100 has already resumed power supply to the heating member 21 using the previous upper limit power UL, a power supplied to the heating member 21 at the time when the detected temperature D has risen again to the cutoff temperature C has a lower value than the power that was supplied to the heating member 21 without using the previous upper limit power UL. Therefore, the newly set upper limit power UL has a lower value than the previous upper limit power UL. From this point of view as well, the present embodiment can achieve rapid convergence of the temperature of the heating member 21 to the target temperature T.

Although the above embodiment has been described with respect to the case where the controller 100 includes the temperature sensor 23 that detects the temperature of the heating member 21 and drives the heating member 21 using PID control to bring the temperature D detected by the temperature sensor 23 (the temperature of the heating member 21) to the target temperature T, it is possible to provide another embodiment in which the controller 100 includes a temperature sensor that detects the temperature of the fixing member 20 and drives the heating member 21 using PID control to bring the temperature of the fixing member 20 to a predetermined target temperature.

In the above embodiment, the heating member 21 is not limited to the planar heater described above, but the present disclosure is more effective when a heater with a small heat capacity (a heater whose temperature easily changes, rises and falls) such as the planar heater described above is used as the heating member 21 than when a heater with a large heat capacity is used as the heating member 21.

The present disclosure is not limited to the configuration of the above embodiment and various modifications are possible. The configuration and processing of the above embodiment illustrated using FIGS. 1 to 5 is merely one embodiment of the present disclosure without the intention to limit the present disclosure to the configuration and processing illustrated.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:

a fixing device including:

a fixing member;

a pressure member disposed to face the fixing member, the pressure member forming a nip portion between the pressure member and the fixing member into which a recording medium to be fixed is inserted;

a heating member configured to heat the fixing member; and a temperature sensor configured to detect a temperature of the heating member or the fixing member; and a controller including a processor, the controller being configured to drive, by the processor executing a control program, the heating member using proportional-integral-differential (PID) control to bring the temperature detected by the temperature sensor to a predetermined target temperature, wherein the controller is configured to:

cut off power supply to the heating member when the detected temperature has risen to a predetermined cutoff temperature higher than the target temperature and then resume power supply to the heating member when the detected temperature has fallen below the cutoff temperature; and perform the PID control while limiting a maximum power supplied to the heating member to an upper limit power, which is a power supplied to the heating member at a time when the detected temperature has risen to the cutoff temperature, during a period from when power supply to the heating member is resumed until a predetermined specific period of time elapses.

2. The image forming apparatus according to claim 1, wherein the controller is configured to cut off power supply to the heating member when the detected temperature has risen again to the cutoff temperature after power supply to the heating member is resumed and then continue the PID control using a power supplied to the heating member at a time when the detected temperature has risen again to the cutoff temperature as the upper limit power for the maximum power supplied to the heating member.

3. The image forming apparatus according to claim 1, wherein the fixing member is an endless belt, the heating member is a planar heater disposed inside the fixing member, the planar heater facing an inner peripheral surface of the fixing member, and the temperature sensor is configured to detect the temperature of the heating member.

4. The image forming apparatus according to claim 1, wherein the controller is configured to continue to calculate a power instructed by the PID control based on the detected temperature while power supply to the heating member is cut off.

* * * * *